US011319387B2

(12) United States Patent
Marrani et al.

(10) Patent No.: US 11,319,387 B2
(45) Date of Patent: May 3, 2022

(54) FERROELECTRIC FLUOROPOLYMER

(71) Applicant: SOLVAY SPECIALTY POLYMERS ITALY S.P.A., Bollate (IT)

(72) Inventors: Alessio Marrani, Lecco (IT); Francesco Pedroli, Lyons (FR)

(73) Assignee: SOLVAY SPECIALTY POLYMERS ITALY S.P.A., Bollate (IT)

( * ) Notice: Subject to any disclaimer, the term of this patent is extended or adjusted under 35 U.S.C. 154(b) by 190 days.

(21) Appl. No.: 16/622,125

(22) PCT Filed: Jun. 5, 2018

(86) PCT No.: PCT/EP2018/064793
§ 371 (c)(1),
(2) Date: Dec. 12, 2019

(87) PCT Pub. No.: WO2018/228871
PCT Pub. Date: Dec. 20, 2018

(65) Prior Publication Data
US 2020/0123292 A1  Apr. 23, 2020

(30) Foreign Application Priority Data
Jun. 14, 2017 (EP) ..................... 17175933

(51) Int. Cl.
*C08F 214/22* (2006.01)
*C08F 2/24* (2006.01)
*C08F 214/18* (2006.01)
*C08J 5/18* (2006.01)
*C08K 5/1565* (2006.01)

(52) U.S. Cl.
CPC ............ *C08F 214/222* (2013.01); *C08F 2/24* (2013.01); *C08F 214/182* (2013.01); *C08J 5/18* (2013.01); *C08K 5/1565* (2013.01); *C08J 2327/16* (2013.01)

(58) Field of Classification Search
CPC .... C08F 214/222; C08F 214/182; C08F 2/24; C08J 5/18; C08J 2327/16; C08K 5/1565
USPC ....................................... 526/249
See application file for complete search history.

(56) References Cited

U.S. PATENT DOCUMENTS

| 3,654,210 | A | 4/1972 | Kuhls et al. |
| 4,708,989 | A | 11/1987 | Broussoux et al. |
| 4,990,283 | A | 2/1991 | Visca et al. |
| 5,498,680 | A | 3/1996 | Abusleme et al. |
| 6,103,843 | A | 8/2000 | Abusleme et al. |
| 8,575,286 | B2 * | 11/2013 | Brinati ................... H01L 37/025 526/209 |
| 9,920,141 | B2 * | 3/2018 | Spada ...................... C08F 14/22 |
| 2016/0046746 | A1 * | 2/2016 | Ameduri ............... C08F 214/22 526/255 |

FOREIGN PATENT DOCUMENTS

| CA | 678492 | A | * | 1/1964 | |
| CA | 678492 | A | | 1/1964 | |
| CN | 104497191 | A | | 4/2015 | |
| CN | 105601773 | A | | 5/2016 | |
| EP | 0340740 | A2 | | 11/1989 | |
| EP | 0348980 | A2 | | 1/1990 | |
| EP | 0348981 | A2 | | 1/1990 | |
| EP | 2709113 | A1 | | 3/2014 | |
| GB | 942956 | A | * | 11/1963 | ............... C08J 3/11 |
| GB | 942956 | A | | 11/1963 | |
| JP | 4164907 | A | | 6/1992 | |
| JP | 2003015328 | A2 | | 1/2003 | |
| WO | 07122599 | A2 | | 11/2007 | |
| WO | 2009147030 | A1 | | 12/2009 | |
| WO | 2011073254 | A1 | | 6/2011 | |

OTHER PUBLICATIONS

Schuman P., "Development of vulcanizable elastomers suitable for use in contact with liquid oxygen", NASA (Nat. Aeronaut. Space Admin.), Second Annual Summary report Contract N° NAS8-5352, 1965, p. 146.
Brown, D. et al., "Glass transition temperatures of several fluorine-containing polymers", Journal of Polymer Science, Polymer Physics Edition, 1969, vol. 7(4), pp. 601-608.
Prosser, R. et al., "Protection against intense light. II. Role of the gaseous decomposition products", Journal of Applied Polymer Science, 1972, 1vol. 6(3), pp. 573-583.
Savostin V. et al.,"Interaction of nitrosonium trifluoromethanesulfonate with fluoro olefins and properties of the products", Izvestiya Akademii Nauk SSSR, Seriya Khimicheskaya, 1990, (8), 1851-5.
Nilov, D. et al., "Calculation of properties of halogen-containing polymers", Fiziko-Khimiya Polimerov, 2003, 9, 95-100.

* cited by examiner

*Primary Examiner* — Michael M. Bernshteyn
(74) *Attorney, Agent, or Firm* — Osha Bergman Watanabe & Burton LLP

(57) ABSTRACT

The present invention pertains to a ferroelectric fluoropolymer, to a process for manufacturing said fluoropolymer and to uses of said fluoropolymer in electric and/or electronic applications.

20 Claims, No Drawings

FERROELECTRIC FLUOROPOLYMER

CROSS-REFERENCE TO RELATED APPLICATION

This application is a U.S. national stage entry under 35 U.S.C. § 371 of International Application No. PCT/EP2018/064793 filed Jun. 5, 2018, which claims priority to European application No. EP 17175933.5, filed on Jun. 14, 2017. The entire contents of these applications are explicitly incorporated herein by this reference.

TECHNICAL FIELD

The present invention pertains to a ferroelectric fluoropolymer, to a process for manufacturing said fluoropolymer and to uses of said fluoropolymer in electric and/or electronic applications.

BACKGROUND ART

Vinylidene fluoride (VDF) copolymers comprising recurring units derived from trifluoroethylene (TrFE) have been used extensively in the manufacture of both electrical and electronic devices due to their ease of processing, chemical inertness and attractive ferroelectric, piezoelectric, pyroelectric, ferrorelaxor and dielectric properties.

In particular, due to their high dielectric constants and attractive ferrorelaxor properties, vinylidene fluoride (VDF) terpolymers comprising recurring units derived from trifluoroethylene (TrFE) and chlorotrifluoroethylene (CTFE) have been used in the manufacture of thin film transistor (TFT) devices.

As is well known, the term piezoelectric means the ability of a material to exchange electrical for mechanical energy and vice versa and the electromechanical response is believed to be essentially associated with dimensional changes during deformation or pressure oscillation. The piezoelectric effect is reversible in that materials exhibiting the direct piezoelectric effect (the production of electricity when stress is applied) also exhibit the converse piezoelectric effect (the production of stress and/or strain when an electric field is applied).

Ferroelectricity is the property of a material whereby this latter exhibits a spontaneous electric polarization, the direction of which can be switched between equivalent states by the application of an external electric field.

Pyroelectricity is the ability of certain materials to generate an electrical potential upon heating or cooling. Actually, as a result of this change in temperature, positive and negative charges move to opposite ends through migration (i.e. the material becomes polarized) and hence an electrical potential is established.

Ferrorelaxor is the property of an electroactive material whereby this latter exhibits a large displacement when an electrical field is applied but with no force transfer while actuating.

Materials having good dielectric properties are known in the art.

In particular, high dielectric materials have become even more desirable for manufacturing high performance electrical and electronic devices.

In view of the above, there is still the need in the art for ferroelectric fluoropolymers which can be easily processed thereby providing films endowed with a high dielectric constant and, in certain cases, a high piezoelectric coefficient to be suitably used in electrical or electronic devices.

US 2016/046746 (to Arkema) discloses a copolymer obtained by free-radical copolymerization of vinylidene fluoride with trifluoroethylene and of at least a third monomer, the third monomer having a molar mass greater than 0 g/mol and corresponding to the formula:

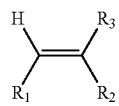

in which $R_1$ is a hydrogen atom or a fluorine atom, and $R_2$ and $R_3$ are chosen, independently of one another, from Cl, F and $CF_3$, and the functional groups are selected from phosphonate, carboxylic acid, $SO_2X$ (where X is F, OK, ONa or OH) or $Si(OR)_3$ (R being a methyl, ethyl or isopropyl group) groups. The third monomer can be chosen from 2,3,3,3-tetrafluoropropene, 2-chloro-3,3,3-trifluoropropene, a, beta-difluoroacrylic acid, 2-(trifluoro)methacrylic acid, dimethyl vinylphosphonate, bromotrifluoroethylene, vinyl trifluoroacetate, itaconic acid and t-butyl 2-(trifluoromethyl)acrylate.

U.S. Pat. No. 4,708,989 (to Thomson CSF) discloses a polymer-based dielectric material with high dielectric constant, formed of an alloy of ferroelectric polymers with different Curie temperatures, whereas the ferroelectric polymers may be vinylidene fluoride and trifluoroethylene copolymers $P(VF_2—VF_3)$[aka VDF/TrFE], e.g. an alloy obtained by mixing two terpolymers or by mixing a terpolymer with a copolymer. Among the terpolymers, mention is specifically made of VDF-TrFE-HFP terpolymers.

CA678492 (PENNSALT CHEMICALS CORP) discloses solutions in certain organic solvents of various VDF polymers; Ex. 6 specifically describes an example of a copolymer of VDF (about 95% moles) and of 1,2-difluoro-1,2-dichloroethylene. No mention is made of VDF-TrFE copolymers.

GB942956 (PENNSALT CHEMICALS CORP) discloses solutions in certain organic solvents of various VDF polymers; Ex. 8 specifically describes an example of an aqueous dispersion containing 30 parts by weight of a copolymer of vinylidene fluoride and symmetrical difluoro-dichloroethylene containing about 5 tool percent of the latter and having a particle size in the range 0.05 to 20 microns.

EP2709113 (BPP CABLES LTD) discloses a cable comprising a first conductor, a first insulator layer and a first plurality of wires, wherein the first insulator layer comprises a first fluoropolymer which is a copolymer comprising:

a first monomer selected from a group consisting of 1,1,2,2-tetrafluoroethylene, 1-fluoroethylene, 1,1-difluoroethylene, 1,2-difluoroethylene, 1,1,2-trifluoroethylene, hexafluoropropene, perfluoropropyl vinyl ether, perfluoroethyl vinyl ether, perfluoromethyl vinyl ether, perfluorobutyl ether, 1-chloro-1,2,2-trifluoroethylene, 1,1 dichloro-2,2-difluoroethylene, 1,2-dichloro-1,2-difluoroethylene, 1,1,2-trichloro-2-fluoroethylene, and hexafluoropropylene, and a second monomer selected from a group consisting of ethylene, propylene, 1,1,2,2-tetrafluoroethylene, 1-fluoroethylene, 1,1-difluoroethylene, 1,2-difluoroethylene, 1,1,2-trifluoroethylene, hexafluoropropylene, perfluoropropyl vinyl ether, perfluoroethyl vinyl ether, perfluoromethyl vinyl ether, perfluorobutyl ether, 1-chloro-1,2,2-trifluoroethylene, 1,1 dichloro 2,2, difluoroethylene, 11,2-dichloro-1,2-difluoroethylene, 1,1,2-trichloro-2-fluoroethylene and hexafluoropropylene.

WO2011/073254 (to Solvay Specialty Polymers Italy SpA) discloses process for manufacturing dispersions of vinylidene fluoride (VDF) thermoplastic polymers in the presence of a combination of (i) a hydrogenated or fluorinated surfactant and of (ii) a said functional PFPE. VDF may be copolymerized with fluorinate monomers being selected in the group consisting of vinylfluoride (VF-1), chlorotrifluoroethylene (CTFE), hexafluoropropene (HFP), tetrafluoroethylene (TFE), perfluoromethylvinylether (MVE), trifluoroethylene (TrFE) and mixtures therefrom.

SUMMARY OF INVENTION

It has been now found that the fluoropolymer of the present invention is advantageously endowed with a high dielectric constant and, in certain cases, a high piezoelectric coefficient to be suitably used in electric and/or electronic devices, while advantageously maintaining good ferroelectric properties.

Thus, in a first instance, the present invention pertains to a fluoropolymer [polymer (F)] comprising:
  recurring units derived from vinylidene fluoride,
  recurring units derived from trifluoroethylene, and
  recurring units derived from 1,2-dichloro-1,2-difluoroethylene.

The polymer (F) of the invention typically comprises recurring units derived from cis-1,2-dichloro-1,2-difluoroethylene or trans-1,2-dichloro-1,2-difluoroethylene, preferably trans-1,2-dichloro-1,2-difluoroethylene (trans-1,2-dichloro-1,2-difluoroethylene is hereinafter referred to as "1112").

The polymer (F) of the invention typically comprises at least 50% by moles, preferably at least 56% by moles, more preferably at least 62% by moles of recurring units derived from vinylidene fluoride, with respect to the total moles of recurring units in said polymer (F).

The polymer (F) of the invention typically comprises from 15% to 30% by moles, preferably comprises from 19% to 28% by moles of recurring units derived from trifluoroethylene, with respect to the total moles of recurring units in said polymer (F).

The polymer (F) of the invention typically comprises from 0.1% to 10% by moles, preferably from 0.5% to 8.5% by moles, more preferably from 1% to 6% by moles, even more preferably from 1% to 5% by moles of recurring units derived from 1,2-dichloro-1,2-difluoroethylene, with respect to the total moles of recurring units in said polymer (F).

The polymer (F) of the invention may further comprise recurring units derived from at least one other fluorinated monomer.

For the purpose of the present invention, the term "fluorinated monomer" is intended to denote an ethylenically unsaturated monomer comprising at least one fluorine atom.

The fluorinated monomer may further comprise one or more other halogen atoms (Cl, Br, I).

Should the polymer (F) of the invention further comprise recurring units derived from at least one other fluorinated monomer, said polymer (F) typically further comprises recurring units derived from at least one fluorinated monomer different from vinylidene fluoride, trifluoroethylene and 1,2-dichloro-1,2-difluoroethylene.

According to an embodiment of the present invention, the polymer (F) of the invention may further comprise recurring units derived from at least one fluorinated monomer selected from chlorotrifluoroethylene and 1,1-chlorofluoroethylene.

According to a preferred embodiment of the present invention, the polymer (F) of the invention may further comprise recurring units derived from chlorotrifluoroethylene.

The polymer (F) of the invention may further comprise from 0.1% to 15% by moles, preferably comprises from 5% to 10% by moles of recurring units derived from at least one other fluorinated monomer, with respect to the total moles of recurring units in said polymer (F).

The polymer (F) of the invention typically comprises, preferably consists of:
  recurring units derived from vinylidene fluoride,
  recurring units derived from trifluoroethylene,
  recurring units derived from 1,2-dichloro-1,2-difluoroethylene, and
  optionally, recurring units derived from at least one other fluorinated monomer.

The polymer (F) of the invention preferably comprises, more preferably consists of:
  recurring units derived from vinylidene fluoride,
  from 15% to 30% by moles, preferably from 19% to 28% by moles of recurring units derived from trifluoroethylene,
  from 0.1% to 10% by moles, preferably from 0.5% to 8.5% by moles, more preferably from 1% to 6% by moles, even more preferably from 1% to 5% by moles of recurring units derived from 1,2-dichloro-1,2-difluoroethylene, and
  optionally, from 0.1% to 10% by moles, preferably comprises from 1% to 5% by moles of recurring units derived from at least one other fluorinated monomer, preferably chlorotrifluoroethylene,
with respect to the total moles of recurring units in said polymer (F).

In a second instance, the present invention pertains to a process for manufacturing the polymer (F) of the invention, said process comprising polymerizing vinylidene fluoride, trifluoroethylene and 1,2-dichloro-1,2-difluoroethylene in the presence of at least one radical initiator.

The process of the invention is typically carried out in the presence of an aqueous medium.

The process of the invention may be carried out by aqueous emulsion polymerization or by aqueous suspension polymerization.

The process of the invention is typically carried out at a temperature of less than 125° C., preferably of less than 80° C.

The aqueous emulsion polymerization is typically carried out in an aqueous medium comprising:
  at least one surfactant [surfactant (S)],
  at least one radical initiator,
  optionally, at least one non-functional perfluoropolyether (PFPE) oil, and
  optionally, at least one chain transfer agent.

For the purpose of the present invention, by "surfactant [surfactant (S)]" it is intended to denote an amphiphilic organic compound containing both hydrophobic groups and hydrophilic groups.

The surfactant (S) is typically selected from the group consisting of:
  hydrogenated surfactants [surfactants (H)],
  fluorinated surfactants [surfactants (F)], and
  mixtures thereof.

The surfactant (H) may be an ionic hydrogenated surfactant [surfactant (IS)] or a non-ionic hydrogenated surfactant [surfactant (NS)].

Non-limiting examples of suitable surfactants (IS) include, notably, 3-allyloxy-2-hydroxy-1-propane sulfonic acid salts, polyvinylphosphonic acid salts, polyacrylic acid salts, polyvinyl sulfonic acid salts and alkyl phosphonates.

The surfactant (H) is preferably a surfactant (NS).

Non-limiting examples of suitable surfactants (NS) include, notably, octylphenol ethoxylates and fatty alcohol polyethers comprising recurring units derived from ethylene oxide and/or propylene oxide.

The surfactant (NS) has generally a cloud point of advantageously 50° C. or more, preferably of 55° C. or more, as measured according to EN 1890 standard (method A: 1% by weight water solution).

The surfactant (NS) is preferably selected from the group consisting of non-ionic hydrogenated surfactants commercially available under the trademark names TRIXON® X and PLURONIC®.

According to a first embodiment of the invention, the surfactant (F) may be a cyclic fluorocompound of formula (II):

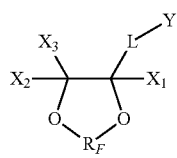
(II)

wherein $X_1$, $X_2$ and $X_3$, equal to or different from each other, are independently selected from the group consisting of H, F and $C_1$-$C_6$ (per)fluoroalkyl groups, optionally comprising one or more catenary or non-catenary oxygen atoms, L is a bond or a divalent group, $R_F$ is a divalent fluorinated $C_1$-$C_3$ bridging group, and Y is an anionic functionality.

In formula (II), the anionic functionality Y is preferably selected from the group consisting of those of formulae:

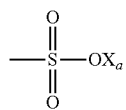
(1″)

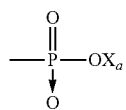
(2″)

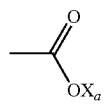
(3″)

wherein $X_a$ is H, a monovalent metal (preferably an alkaline metal) or an ammonium group of formula $-N(R'_n)_4$, wherein $R'_n$, equal or different at each occurrence, is a hydrogen atom or a $C_1$-$C_6$ hydrocarbon group (preferably an alkyl group).

Most preferably, the anionic functionality Y is a carboxylate of formula (3″) as defined above.

According to a first variant of this first embodiment of the invention, the surfactant (F) is a cyclic fluorocompound of formula (III):

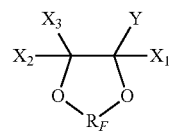
(III)

wherein $X_1$, $X_2$, $X_3$, $R_F$ and Y have the same meaning as defined above.

More preferably, the cyclic fluorocompound of this first variant of this first embodiment of the invention is of formula (IV):

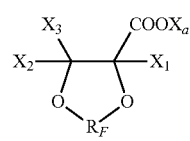
(IV)

wherein $X_1$, $X_2$, $X_3$, $R_F$ and $X_a$ have the same meaning as defined above.

According to a second variant of this first embodiment of the invention, the surfactant (F) is a cyclic fluorocompound of formula (V):

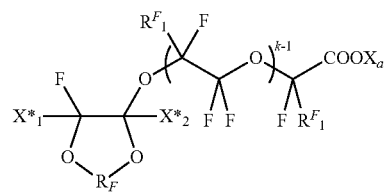
(V)

wherein $R^F$ and $X_a$ have the same meanings as defined above, $X^*_1$, $X^*_2$, equal to or different from each other, are independently a fluorine atom, $-R'_f$ or $-OR'_f$, wherein $R'_f$ is a $C_1$-$C_3$ perfluoroalkyl group, $R^F_1$ is F or $CF_3$, and k is an integer from 1 to 3.

More preferably, the surfactant (F) of this first embodiment of the invention is a cyclic fluorocompound of formula (VI):

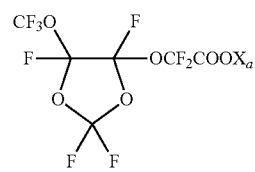
(VI)

wherein $X_a$ has the same meaning as defined above and, in particular, with $X_a$ being $NH_4$.

According to a second embodiment of the invention, the surfactant (F) may be a fluorinated surfactant of formula (VII):

$$R_{fS}(X^-)_k(M^+)_k \qquad (VII)$$

wherein:
  $R_{fS}$ is selected from a $C_4$-$C_{16}$ (per)fluoroalkyl chain, optionally comprising one or more catenary or non-catenary oxygen atoms, and a (per)fluoropolyoxyalkyl chain, $X^-$ is selected from —COO$^-$, —PO$_3^-$ and —SO$_3^-$, $M^+$ is selected from NH$_4^+$ and an alkaline metal ion, and k is 1 or 2.

Non-limiting examples of surfactants (F) according to this second embodiment of invention suitable for use in emulsion polymerization in an aqueous polymerization medium include, notably, the followings:

(a') CF$_3$(CF$_2$)$_{n0}$COOM', wherein no is an integer ranging from 4 to 10, preferably from 5 to 7, preferably no being equal to 6, and M' represents NH$_4$, Na, Li or K, preferably NH$_4$;

(b') T-(C$_3$F$_6$O)$_{n1}$(CFYO)$_{m1}$CF$_2$COOM", wherein T represents a Cl atom or a perfluoroalkoxyde group of formula C$_x$F$_{2x+1-x'}$Cl$_{x'}$O, wherein x is an integer ranging from 1 to 3 and x' is 0 or 1, $n_1$ is an integer ranging from 1 to 6, $m_1$ is 0 or an integer ranging from 1 to 6, M" represents NH$_4$, Na, Li or K and Y represents F or —CF$_3$;

(c') F—(CF$_2$CF$_2$)$_{n2}$—CH$_2$—CH$_2$—X*O$_3$M''', wherein X* is a phosphorus or a sulphur atom, preferably X* being a sulphur atom, M''' represents NH$_4$, Na, Li or K and $n_2$ is an integer ranging from 2 to 5, preferably $n_2$ being equal to 3;

(d') A-R$_{bf}$—B bifunctional fluorinated surfactants, wherein A and B, equal to or different from each other, have formula —(O)$_p$CFY"-COOM*, wherein M* represents NH$_4$, Na, Li or K, preferably M* representing NH$_4$, Y" is F or —CF$_3$ and p is 0 or 1, and R$_{bf}$ is a divalent (per)fluoroalkyl chain or (per)fluoropolyether chain such that the number average molecular weight of A-R$_{bf}$—B is in the range of from 300 to 1800; and (e') mixtures thereof.

An aqueous latex is typically obtainable by a process carried out by aqueous emulsion polymerization. The aqueous latex of the invention preferably comprises at least one polymer (F) in the form of primary particles having an average primary particle size comprised between 50 nm and 450 nm, preferably between 250 nm and 300 nm, as measured according to ISO 13321.

For the purpose of the present invention, by "average primary particle size" it is intended to denote the average size of primary particles of polymer (F) obtainable by emulsion polymerization.

For the purpose of the present invention, "primary particles" of polymer (F) are to be intended distinguishable from agglomerates of primary particles. Aqueous latexes comprising primary particles of polymer (F) are advantageously obtainable by emulsion polymerization in an aqueous polymerization medium. Agglomerates of primary particles of polymer (F) are typically obtainable by recovery and conditioning steps of polymer (F) manufacture such as concentration and/or coagulation of aqueous polymer (F) latexes and subsequent drying and homogenization thereby providing polymer (F) powders.

The aqueous latex of the invention is thus to be intended distinguishable from an aqueous slurry prepared by dispersing polymer (F) powders in an aqueous medium. The average particle size of polymer (F) powders dispersed in an aqueous slurry is typically higher than 1 μm, as measured according to ISO 13321.

The aqueous latex of the invention advantageously has homogeneously dispersed therein primary particles of at least one polymer (F) having an average primary particle size comprised between 50 nm and 450 nm, preferably between 250 nm and 300 nm, as measured according to ISO 13321.

The aqueous emulsion polymerization is typically carried out at a pressure comprised between 10 bar and 80 bar, preferably between 15 bar and 35 bar.

The skilled in the art will choose the polymerization temperature having regards, inter alia, of the radical initiator used. The aqueous emulsion polymerization is typically carried out at a temperature comprised between 50° C. and 90° C., preferably between 60° C. and 80° C.

While the choice of the radical initiator is not particularly limited, it is understood that water-soluble radical initiators suitable for aqueous emulsion polymerization are selected from compounds capable of initiating and/or accelerating the polymerization process.

Inorganic radical initiators may be used and include, but are not limited to, persulfates such as sodium, potassium and ammonium persulfates, permanganates such as potassium permanganate.

Also, organic radical initiators may be used and include, but are not limited to, the followings: acetylcyclohexanesulfonyl peroxide; diacetylperoxydicarbonate; dialkylperoxydicarbonates such as diethylperoxydicarbonate, dicyclohexylperoxydicarbonate, di-2-ethylhexylperoxydicarbonate; tert-butylperneodecanoate; 2,2'-azobis(4-methoxy-2,4-dimethylvaleronitrile; tert-butylperpivalate; dioctanoylperoxide; dilauroyl-peroxide; 2,2'-azobis (2,4-dimethylvaleronitrile); tert-butylazo-2-cyanobutane; dibenzoylperoxide; tert-butylper-2ethylhexanoate; tert-butylpermaleate; 2,2'-azobis (isobutyronitrile); bis(tert-butylperoxy)cyclohexane; tert-butyl-peroxyisopropylcarbonate; tert-butylperacetate; 2,2'-bis (tert-butylperoxy)butane; dicumyl peroxide; di-tert-amyl peroxide; di-tert-butyl peroxide (DTBP); p-methane hydroperoxide; pinane hydroperoxide; cumene hydroperoxide; and tert-butyl hydroperoxide.

Other suitable radical initiators notably include halogenated free radical initiators such as chlorocarbon based and fluorocarbon based acyl peroxides such as trichloroacetyl peroxide, bis(perfluoro-2-propoxy propionyl) peroxide, [CF$_3$CF$_2$CF$_2$OCF(CF$_3$)COO]$_2$, perfluoropropionyl peroxides, (CF$_3$CF$_2$CF$_2$COO)$_2$, (CF$_3$CF$_2$COO)$_2$, {(CF$_3$CF$_2$CF$_2$)—[CF(CF$_3$)CF$_2$O]$_m$—CF(CF$_3$)—COO}$_2$ where m=0-8, [ClCF$_2$(CF$_2$)$_n$COO]$_2$, and [HCF$_2$(CF$_2$)$_n$COO]$_2$ where n=0-8; perfluoroalkyl azo compounds such as perfluoroazoisopropane, [(CF$_3$)$_2$CFN=]$_2$, R$^¤$N=NR$^¤$, where R$^¤$ is a linear or branched perfluorocarbon group having 1-8 carbons; stable or hindered perfluoroalkane radicals such as hexafluoropropylene trimer radical, [(CF$_3$)$_2$CF]$_2$(CF$_2$CF$_2$)C$^•$ radical and perfluoroalkanes.

Redox systems, comprising at least two components forming a redox couple, such as dimethylaniline-benzoyl peroxide, diethylaniline-benzoyl peroxide and diphenylamine-benzoyl peroxide may also be used as radical initiators to initiate the polymerization process.

Among inorganic radical initiators, ammonium persulfate is particularly preferred.

Among organic radical initiators, the peroxides having a self-accelerating decomposition temperature (SADT) higher than 50° C. are particularly preferred, such as for instance: di-tert-butyl peroxide (DTBP), diterbutylperoxyisopropylcarbonate, terbutyl(2-ethyl-hexyl)peroxycarbonate, terbutylperoxy-3,5,5-trimethylhexanoate.

One or more radical initiators as defined above may be added to the aqueous polymerization medium of the emulsion polymerization process in an amount ranging advantageously from 0.001% to 20% by weight based on the weight of the aqueous polymerization medium.

By "non-functional perfluoropolyether (PFPE) oil" it is hereby intended to denote a perfluoropolyether (PFPE) oil comprising a (per)fluoropolyoxyalkylene chain [chain (R$_f$)] and non-functional end-groups.

The non-functional end groups of the non-functional PFPE oil are generally selected from fluoro(halo)alkyl groups having 1 to 3 carbon atoms, optionally comprising one or more halogen atoms different from fluorine or hydrogen atoms, e.g. $CF_3$—, $C_2F_5$—, $C_3F_6$—, $ClCF_2CF(CF_3)$—, $CF_3CFClCF_2$—, $ClCF_2CF_2$—, $ClCF_2$—.

The non-functional PFPE oil typically has a number average molecular weight comprised between 400 and 3000, preferably between 600 and 1500.

The non-functional PFPE oil is preferably selected from the group consisting of:

(1') non-functional PFPE oils commercially available from Solvay Solexis S.p.A. under the trademark names GALDEN® and FOMBLIN®, said PFPE oils generally comprising at least one PFPE oil complying with either of formulae here below:

$$CF_3-[(OCF_2CF_2)_m-(OCF_2)_n]-OCF_3$$

m+n=40-180; m/n=0.5-2

$$CF_3-[(OCF(CF_3)CF_2)_p-(OCF_2)_q]-OCF_3$$

p+q=8-45; p/q=20-1000

(2') non-functional PFPE oils commercially available from Daikin under the trademark name DEMNUM®, said PFPEs generally comprising at least one PFPE complying with formula here below:

$$F-(CF_2CF_2CF_2O)_n-(CF_2CF_2CH_2O)_j-CF_2CF_3$$

j=0 or integer>0; n+j=10-150

(3') non-functional PFPE oils commercially available from Du Pont de Nemours under the trademark name KRYTOX®, said PFPEs generally comprising at least one low-molecular weight, fluorine end-capped, homopolymer of hexafluoropropylene epoxide complying with formula here below:

$$F-(CF(CF_3)CF_2O)_n-CF_2CF_3$$

n=10-60

The non-functional PFPE oil is more preferably selected from those having formula (1') as defined above.

The chain transfer agent, if any, is generally selected from those known in the polymerization of fluorinated monomers such as ethane, ketones, esters, ethers or aliphatic alcohols having from 3 to 10 carbon atoms like, e.g., acetone, ethyl acetate, diethylether, methyl-ter-butyl ether, isopropyl alcohol; chloro(fluoro)carbons, optionally containing hydrogen, having from 1 to 6 carbon atoms, like, e.g., chloroform, trichlorofluoromethane; bis(alkyl)carbonates wherein the alkyl has from 1 to 5 carbon atoms like, e.g., bis(ethyl) carbonate, bis(isobutyl)carbonate.

The chain transfer agent, if any, may be fed to the aqueous polymerization medium at the beginning, continuously or in discrete amounts (step-wise) during the polymerization, continuous or stepwise feeding being preferred.

Aqueous emulsion polymerization processes as detailed above have been described in the art (see e.g. U.S. Pat. No. 4,990,283 (AUSIMONT S.P.A.) 5 Feb. 1991, U.S. Pat. No. 5,498,680 (AUSIMONT S.P.A.) 12 Mar. 1996 and U.S. Pat. No. 6,103,843 (AUSIMONT S.P.A.) 15 Aug. 2000).

The aqueous latex of the invention preferably comprises from 20% to 30% by weight of at least one polymer (F).

The aqueous latex may be up-concentrated according to any techniques known in the art.

In a third instance, the present invention pertains to a composition [composition (C)] comprising at least one polymer (F) as defined above.

The composition (C) of the invention may further comprise a liquid medium [medium (L)].

For the purpose of the present invention, the term "liquid medium [medium (L)]" is intended to denote a medium comprising one or more compounds in liquid state at 20° C. under atmospheric pressure.

The nature of the medium (L) is not particularly limited provided that it is suitable for dissolving the polymer (F).

The medium (L) typically comprises one or more organic solvents.

In a fourth instance, the present invention pertains to a fluoropolymer film [film (F)] comprising the composition (C) as defined above.

In a fifth instance, the present invention pertains to a process for manufacturing the film (F) of the invention, said process comprising processing the composition (C) as defined above into a film.

The film (F) of the invention is typically dried and, then, optionally annealed.

Should the composition (C) further comprise a medium (L), the film (F) of the invention is typically obtainable by a process comprising:

(i) providing a substrate, (ii) providing a composition [composition (C)] as defined above, said composition further comprising a liquid medium [medium (L)], (iii) applying the composition (C) provided in step (ii) onto at least one surface of the substrate provided in step (i) thereby providing a wet film, (iv) drying the wet film provided in step (iii) thereby providing a dried film, and optionally, (v) annealing the dried film provided in step (iv).

It has been found that the film (F) obtainable by the process of the invention is advantageously a homogeneous fluoropolymer film having good mechanical properties to be suitably used in various applications.

For the purpose of the present invention, the term "film" is intended to denote a flat piece of material having a thickness smaller than either of its length or its width.

Under step (i) of the process for manufacturing the film (F) of the invention, the substrate is typically a non-porous substrate.

By the term "non-porous substrate" it is hereby intended to denote a dense substrate layer free from pores of finite dimensions.

Under step (iii) of the process for manufacturing the film (F) of the invention, the composition (C) is applied onto at least one surface of the substrate provided in step (i) typically by using a processing technique selected from the group consisting of casting, spray coating, roll coating, doctor blading, slot die coating, gravure coating, ink jet printing, spin coating, screen printing, brush, squeegee, foam applicator, curtain coating and vacuum coating.

The drying temperature will be selected so as to effect removal by evaporation of one or more organic solvents from the film (F) of the invention.

Drying is typically carried out at a temperature of at least 50° C. Drying is preferably carried out at a temperature comprised between 50° C. and 100° C. Drying can be performed either under atmospheric pressure or under vacuum. Alternatively, drying can be performed under modified atmosphere, e.g. under an inert gas, typically exempt notably from moisture (water vapour content of less than 0.001% v/v).

Annealing is typically carried out at a temperature comprised between 60° C. and 115° C. Annealing can be performed during a time comprised between 15 and 120 minutes, typically depending upon the thickness of the film (F).

The film (F) is typically free from any organic solvent.

The film (F) advantageously has a thickness comprised between 100 nm and 100 µm.

The thickness of the film (F) can be measured according to any suitable techniques such as reflectometry, profilometry, scanning electron microscopy and atomic force microscopy.

The composition (C) may further comprise one or more additives.

The choice of the additives is not particularly limited provided that they do not interfere with solubility of the polymer(s) (F) in the medium (L), if any.

Non-limitative examples of suitable additives include, notably, pigments, UV absorbers, crosslinking agents, crosslinking initiators, organic and inorganic fillers such as ceramics, glass, silica, conductive metal particles, semiconductive oxides, carbon nanotubes, graphenes, core-shell particles, encapsulated particles, conductive salts, silicon-based particles.

Should the composition (C) further comprise one or more additives, the film (F) thereby provided typically comprises a composition (C) further comprising at least one additive.

Should the composition (C) further comprise one or more additives selected from the group consisting of crosslinking agents and crosslinking initiators, the film (F) thereby provided is advantageously a crosslinkable fluoropolymer film [film (FC)] which typically comprises a composition (C) further comprising at least one additive selected from the group consisting of crosslinking agents and crosslinking initiators.

In a sixth instance, the present invention pertains to use of the polymer (F) or the film (F) of the invention in electric and/or electronic devices.

Should the disclosure of any patents, patent applications, and publications which are incorporated herein by reference conflict with the description of the present application to the extent that it may render a term unclear, the present description shall take precedence.

The invention will be now described in more detail with reference to the following examples whose purpose is merely illustrative and not limitative of the scope of the invention.

Raw Materials

Polymer (F-a): VDF (69.9% by moles)-TrFE (27.9% by moles)-1112 (2.2% by moles).

Polymer (F-b): VDF (68.2% by moles)-TrFE (26.4% by moles)-1112 (5.4% by moles).

Polymer (F-c): VDF (66.2% by moles)-TrFE (25.6% by moles)-1112 (8.2% by moles).

Polymer (F-d): VDF (67.1% by moles)-TrFE (24.2% by moles)-CTFE (7.1% by moles)-1112 (1.6% by moles).

Polymer (a): VDF (76.1% by moles)-TrFE (23.9% by moles).

Polymer (b): VDF (57.5% by moles)-TrFE (34.8% by moles)-CTFE (7.7% by moles).

Manufacture of the Polymer (F-a)

In an AISI 316 steel horizontal autoclave, equipped with baffles and a stirrer working at 90 rpm, 14.2 liter of demineralized water were introduced. The temperature was then brought to reaction temperature of 70° C. When this temperature was reached, 335 g of a 35% w/w aqueous solution of cyclic surfactant of formula (VI) as defined above, with $X_a$=NH$_4$, 7 bar of vinylidene fluoride and 4 ml of trans-1,2-dichloro-1,2-difluoroethylene were introduced.

A gaseous mixture of VDF-TrFE in the molar ratio of 70/30 was subsequently added via a compressor until reaching a pressure of 30 bar. By a metering pump, 200 ml of a 3% by weight aqueous solution of sodium persulfate (NaPS) was fed. The polymerization pressure was maintained constant by feeding the above mentioned monomeric mixture; 2 ml of trans-1,2-dichloro-1,2-difluoroethylene were fed every 28 g of synthesized polymer to a total amount of 42 ml. When 560 g of the mixture were fed, the pressure was let fall down up to 15 bar and the reactor was cooled to room temperature. The latex was discharged, frozen for 48 hours and, once unfrozen, the coagulated polymer was washed with demineralized water and dried at 80° C. for 48 hours.

The properties of the polymer (F-a) are set forth in Table 1.

Manufacture of the Polymer (F-b)

The same conditions under the general procedure for the manufacture of the polymer (F-a) were followed but introducing the following modifications:
- using 150 ml of a 3% by weight aqueous solution of sodium persulfate (NaPS),
- feeding 6 ml of trans-1,2-dichloro-1,2-difluoroethylene before pressurizing the reactor with the monomeric mixture, and
- feeding 6 ml of trans-1,2-dichloro-1,2-difluoroethylene every 56 g of synthesized polymer to a total amount of 60 ml.

The properties of the polymer (F-b) are set forth in Table 1.

Manufacture of the Polymer (F-c)

The same conditions under the general procedure for the manufacture of the polymer (F-a) were followed but introducing the following modifications:
- using 160 ml of a 3% by weight aqueous solution of sodium persulfate (NaPS),
- feeding 8 ml of trans-1,2-dichloro-1,2-difluoroethylene before pressurizing the reactor with the monomeric mixture,
- feeding 8 ml of trans-1,2-dichloro-1,2-difluoroethylene every 52 g of synthesized polymer to a total amount of 80 ml, and
- feeding 20 g of ethyl acetate as chain transfer agent.

The properties of the polymer (F-c) are set forth in Table 1.

Manufacture of the Polymer (F-d)

The same conditions under the general procedure for the manufacture of the polymer (F-a) were followed but introducing the following modifications, at a reaction temperature of 80° C.:
- feeding a gaseous mixture of VDF-TrFE-CTFE in molar ratio of 63/28/9,
- feeding 5 bar of VDF,
- feeding 0.5 bar of CTFE,
- using 60 ml of a 3% by weight aqueous solution of sodium persulfate (NaPS),
- feeding a total amount of 5 ml of trans-1,2-dichloro-1,2-difluoroethylene before pressurizing the reactor with the monomeric mixture, and
- feeding 20 g of ethyl acetate as chain transfer agent.

The properties of the polymer (F-d) are set forth in Table 1.

Manufacture of the Polymer (a)

The same conditions under the general procedure for the manufacture of the polymer (F-a) were followed but introducing the following modifications, without adding trans-1,2-dichloro-1,2-difluoroethylene:

feeding a gaseous mixture of VDF-TrFE in a molar ratio of 75/25, using 180 ml of a 3% by weight aqueous solution of sodium persulfate (NaPS), and using 50 g of ethyl acetate as chain transfer agent.

The properties of the polymer (a) are set forth in Table 1.

Manufacture of the Polymer (b)

The same conditions under the general procedure for the manufacture of the polymer (F-a) were followed but introducing the following modifications, without adding trans-1,2-dichloro-1,2-difluoroethylene:

feeding a gaseous mixture of VDF-TrFE-CTFE in a molar ratio of 63/28/9, feeding 5 bar of VDF, feeding 0.5 bar of CTFE, using 180 ml of a 3% by weight aqueous solution of sodium persulfate (NaPS), and using 20 grams of ethyl acetate as chain transfer agent.

The properties of the polymer (b) are set forth in Table 1.

General Procedure for the Manufacture of a Fluoropolymer Film

A solution of the polymer in methylethylketone having a concentration of 20% w/w was prepared and a film was casted therefrom by doctor blade technique, using an Elcometer automatic film applicator, model 4380, onto a glass substrate.

The polymer layer so casted was dried at 70° C. for 2 hours under vacuum. On the so obtained dried film, 12 patterns of 1 cm×1 cm were printed by inkjet printing technique as electrodes on both sides of the films using as conductive material a poly(3,4-ethylenedioxythiophene) polystyrene sulfonate (PEDOT:PSS) purchased by Agfa-Gevaert under the trademark name ORGACON®.

The thickness of the sample was measured using a Mitutoyo micrometer.

Annealing of the Fluoropolymer Film

The annealing temperature was selected for each fluoropolymer film according to the melting temperature of each fluoropolymer: $T_{annealing} = T_{melting} - 5°$ C.

Annealing was performed leaving the fluoropolymer film for one hour at a constant temperature ($T_{annealing}$) in a conventional oven, following by slow cooling until room temperature. Slow cooling was performed switching-off the oven and leaving the whole system to reach room temperature.

Poling of the Fluoropolymer Film

A LC Precision poling equipment equipped with a High Voltage Interface with 10 KV maximum field generated by RADIANT was used for poling of the fluoropolymer film. The annealed film was placed in the polarization cell where a variable field from 80 V/μm to 250 V/μm was applied trough the sample.

Determination of the Dielectric Constant of the Fluoropolymer Film

The value of dielectric permittivity [k] was derived from the direct measurement of dielectric capacitance by a piezo meter system provided by Piezotest. The capacitance values were all measured at 110 Hz. The measurements were also used to check the electrical homogeneity and electrical conductivity of the electrodes.

$$\text{Dielectric permittivity}[k] = \frac{\text{Capacitance}[F] \times \text{Thickness}[m]}{\varepsilon_0[F/m] \times \text{Area}[m^2]}$$

Determination of the Piezoelectric Coefficient of the Fluoropolymer Film

The value of the piezoelectric coefficient (d33) was measured using a PiezoMeter PM 300 system (PiezoTest Inc.) by placing the poled sample in the instrument strain gouge where the film is stimulated under a vibration at 110 Hz at room temperature. The d33 value is reported as μC/N.

The results are shown in Table 1 here below:

TABLE 1

| Polymer | $T_{Curie}$ [° C.] | $T_{melting}$ [° C.] | Dielectric permittivity [k] | | Piezoelectric coefficient [μC/N] | |
|---|---|---|---|---|---|---|
| | | | before annealing | after annealing | before annealing | after annealing |
| (F-a) | 67.4 | 122.4 | 18.5 | 20.5 | 21.0 | 25.0 |
| (F-b) | 52.7 | 116.0 | 16.0 | 18.0 | 20.0 | 17.3 |
| (F-c) | 30.3 | 105.2 | 18.5 | 20.3 | 7.4 | 6.5 |
| (F-d) | 21.6 | 118.8 | 53.0 | 59.0 | 0 | 0 |
| (a) | 119.8 | 147.0 | 9.0 | 9.0 | 2.0 | 27.0 |
| (b) | 33.4 | 122.6 | 29.0 | 24.0 | 0 | 1.4 |

As shown in Table 1, the polymer (F) of the present invention as notably embodied by any of the polymers (F-a), (F-b), (F-c) and (F-d) according to the invention has advantageously a Curie temperature ($T_{Curie}$) below which its retains its ferroelectric properties.

Also, as shown in Table 1, the polymer (F) of the present invention as notably embodied by any of the polymers (F-a), (F-b) and (F-c) according to the invention is endowed with a higher dielectric constant as compared to the polymer (a) either before annealing or after annealing.

In particular, the polymer (F-d) according to the invention is endowed with a higher dielectric constant as compared to the polymer (b) either before annealing or after annealing.

Further, as shown in Table 1, the polymer (F) of the present invention as notably embodied by any of the polymers (F-a), (F-b) and (F-c) according to the invention is endowed with a higher piezoelectric coefficient as compared to any of the polymer (a) and the polymer (b) even before annealing.

In view of the above, it has been found that the polymer (F) of the present invention or any films thereof is particularly suitable for use in electric and/or electronic devices.

The invention claimed is:

1. A fluoropolymer [polymer (F)] comprising:
   recurring units derived from vinylidene fluoride,
   recurring units derived from trifluoroethylene, and
   recurring units derived from 1,2-dichloro-1,2-difluoroethylene.

2. The polymer (F) according to claim 1, wherein the recurring units derived from 1,2-dichloro-1,2-difluoroethylene are recurring units derived from cis-1,2-dichloro-1,2-difluoroethylene or trans-1,2-dichloro-1,2-difluoroethylene.

3. The polymer (F) according to claim 1, said polymer (F) comprising from 15% to 30% by moles of recurring units derived from trifluoroethylene, with respect to the total moles of recurring units in said polymer (F).

4. The polymer (F) according to claim 1, said polymer (F) comprising from 0.1% to 10% by moles of recurring units derived from 1,2-dichloro-1,2-difluoroethylene, with respect to the total moles of recurring units in said polymer (F).

5. The polymer (F) according to claim 1, said polymer (F) further comprising recurring units derived from at least one fluorinated monomer selected from chlorotrifluoroethylene and 1,1-chlorofluoroethylene.

6. A process for manufacturing the polymer (F) according to claim 1, said process comprising polymerizing vinylidene fluoride, trifluoroethylene and 1,2-dichloro-1,2-difluoroethylene in the presence of at least one radical initiator.

7. The process according to claim 6, said process being carried out in the presence of an aqueous medium.

8. The process according to claim 6, said process being carried out by aqueous emulsion polymerization or by aqueous suspension polymerization.

9. The process according to claim 6, said process being carried out by aqueous emulsion polymerization in an aqueous medium comprising:
- at least one surfactant (S),
- at least one radical initiator,
- optionally, at least one non-functional perfluoropolyether (PFPE) oil, and
- optionally, at least one chain transfer agent.

10. The process according to claim 6, wherein the surfactant (F) is a cyclic fluorocompound of formula (II):

(II)

wherein $X_1$, $X_2$ and $X_3$, equal to or different from each other, are independently selected from the group consisting of H, F and $C_1$-$C_6$ (per)fluoroalkyl groups, optionally comprising one or more catenary or non-catenary oxygen atoms, L is a bond or a divalent group, $R_F$ is a divalent fluorinated $C_1$-$C_3$ bridging group, and Y is an anionic functionality.

11. A composition (C) comprising at least one polymer (F) according to claim 1.

12. The composition (C) according to claim 11, said composition (C) further comprising one or more additives.

13. A fluoropolymer film (F) comprising the composition (C) according to claim 11.

14. A process for manufacturing the film (F) according to claim 13, said process comprising processing the composition (C) into a film.

15. An electric and/or electronic device comprising the polymer (F) according to claim 1.

16. The polymer (F) according to claim 2, wherein the recurring units derived from 1,2-dichloro-1,2-difluoroethylene are recurring units derived from trans-1,2-dichloro-1,2-difluoroethylene.

17. The polymer (F) according to claim 3, said polymer (F) comprising from 19% to 28% by moles of recurring units derived from trifluoroethylene, with respect to the total moles of recurring units in said polymer (F).

18. The polymer (F) according to claim 4, said polymer (F) comprising from 0.5% to 8.5% by moles of recurring units derived from 1,2-dichloro-1,2-difluoroethylene, with respect to the total moles of recurring units in said polymer (F).

19. The polymer (F) according to claim 18, said polymer (F) comprising from 1% to 6% by moles of recurring units derived from 1,2-dichloro-1,2-difluoroethylene, with respect to the total moles of recurring units in said polymer (F).

20. The polymer (F) according to claim 19, said polymer (F) comprising from 1% to 5% by moles of recurring units derived from 1,2-dichloro-1,2-difluoroethylene, with respect to the total moles of recurring units in said polymer (F).

* * * * *